United States Patent
Tormasov

(10) Patent No.: US 7,886,120 B1
(45) Date of Patent: *Feb. 8, 2011

(54) SYSTEM AND METHOD FOR EFFICIENT BACKUP USING HASHES

(75) Inventor: Alexander G. Tormasov, Moscow (RU)

(73) Assignee: Acronis Inc., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 12/643,076

(22) Filed: Dec. 21, 2009

Related U.S. Application Data

(63) Continuation of application No. 11/757,442, filed on Jun. 4, 2007, now Pat. No. 7,636,824.

(60) Provisional application No. 60/806,088, filed on Jun. 28, 2006.

(51) Int. Cl.
*G06F 12/00* (2006.01)

(52) U.S. Cl. ............. 711/162; 711/126; 711/161; 711/E12.031

(58) Field of Classification Search ............... None
See application file for complete search history.

(56) References Cited

U.S. PATENT DOCUMENTS

| | | | | |
|---|---|---|---|---|
| 5,559,991 A * | 9/1996 | Kanfi | ............ | 711/162 |
| 6,928,526 B1 * | 8/2005 | Zhu et al. | ............ | 711/154 |
| 7,143,251 B1 * | 11/2006 | Patterson | ............ | 711/162 |
| 7,464,234 B1 * | 12/2008 | Stringham | ............ | 711/162 |
| 2004/0143713 A1 * | 7/2004 | Niles et al. | ............ | 711/162 |

* cited by examiner

*Primary Examiner*—Reginald G Bragdon
*Assistant Examiner*—Arvind Talukdar
(74) *Attorney, Agent, or Firm*—Bardmesser Law Group

(57) ABSTRACT

A method, system and computer program product for data backup such that: for each block of a storage device to be backed up to an image, generating a hash function value corresponding to contents of that block; generating a map of links between blocks in the image and corresponding blocks the storage device; using the hash function values to identify blocks of the storage device with identical contents, such that links for the blocks in the storage device with identical contents point to a single block in the image; and modifying the link in the map when a block in the storage is moved (for example, due to defragmentation) but its contents is not altered, so that the link points to the same backed up block.

12 Claims, 8 Drawing Sheets

SYSTEM AND METHOD FOR EFFICIENT BACKUP USING HASHES

CROSS-REFERENCE TO RELATED APPLICATIONS

This application is a continuation of U.S. patent application Ser. No. 11/757,442 filed on Jun. 4, 2007, entitled SYSTEM AND METHOD FOR EFFICIENT BACKUP USING HASHES, now U.S. Pat. No. 7,636,824, which is a non-provisional of U.S. Provisional Patent Application No. 60/806,088, filed Jun. 28, 2006, entitled SYSTEM AND METHOD FOR EFFICIENT POST-DEFRAGMENTATION BACKUP USING HASHES, which are both incorporated herein by reference in their entirety.

BACKGROUND OF THE INVENTION

1. Field of the Invention

The present invention relates to backups, and, more particularly, to optimizing backup overhead for defragmented disks.

2. Related Art

One of the problems with conventional backup schemes relates to defragmentation of the disk drive. As a practical matter, most large files are not stored on a disk sequentially. This is due to the fact that as files are added to the drive and deleted from the disk drive, free blocks become available, which the operating system then uses to store pieces of the file, wherever space is available. Thus, a single file can be broken up into a number of blocks, stored at different locations on the disk drive. When the file is accessed, those blocks are collected, and put back together into the original file. This operation involves overhead, and therefore it is desirable to have files whose blocks are stored sequentially, wherever possible. The process that rearranges the stored blocks on the disk, so that the blocks of the files are stored sequentially, to the extent possible, is called "defragmentation."

Defragmentation can be performed relatively often, particularly in a server environment, where the server maintains a large number of files that constantly change. The problem with defragmentation and backups is that as far as the backup software is concerned, after the disk drive has been defragmented, it essentially needs to be backup all over again—from the perspective of the backup software, it is no longer possible to do an incremental backup, since such a large number of files have "changed." This is despite the fact that the actual content of the files does not change at all—only the locations of the blocks that make up the file change. Therefore, an unnecessary complete (or near complete) backup needs to be performed after defragmentation, incurring considerable additional overhead due to the backup process.

Hierarchical Storage Management (HSM) system is known for backing up content of storage devices on different storage media. There are also conventional methods for investigating and using patterns in data processing. For example, the Ziv, Lempel and Welch algorithms implemented for data compression use detection of exact repetitions of data strings, and storing only a single instance of repeated string. This method uses limited spaces for storing content of repeated blocks and could not be used with acceptable performance for identification contents of long random data sequences similar to blocks of the storage devices.

Accordingly, there is a need in the art for the method of backing up large amounts of data storage device data with high performance and reliability.

SUMMARY OF THE INVENTION

The present invention relates to a system and method for efficiently handling post-defragmentation backup that substantially obviates one or more of the disadvantages of the related art.

In particular, one embodiment of the invention improves usage of storage resources while backing up mass storages of set of workstations usually having similar data being stored. Another area where efficiency of the backup storage can be improved is servers and workstations, with frequently updated software, where new versions often contain same files as the prior version. For example, a group of servers with the same operating system and sets of software (e.g., web servers) may be backed up with improved efficiency of storage space usage.

More particularly, in an exemplary embodiment of the present invention, a method, system and computer program product for method for data backup such that for each block of a storage device to be backed up to an image, where the storage device can be restored from the image, generating a hash function value corresponding to contents of that block; generating a map of links between blocks in the image and corresponding blocks the storage device; using the hash function values to identify blocks of the storage device with identical contents, such that links for the blocks in the storage device with identical contents point to a single block in the image; and modifying the link in the map when a block in the storage is moved (for example, due to defragmentation) but its contents is not altered, so that the link points to the same backed up block.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

The present invention is related to a utility for backing up data. The utility works on a data block level, where "blocks" can refer to some basic unit of storage space on a disk, such as disk sectors, or clusters or similar aggregates of sub-units. In some embodiments, a "block" for hash calculation may be defined as a chain of clusters or other sub-units. In other words, "blocks" are basic data units defined either by hardware (e.g., sectors), by software (e.g., clusters) or by the backup application (e.g., chains).

It should be understood that although the term "storage drive" is used for description of hard drive, the actual storage medium at issue does not need to be an entire disk drive (or even a disk drive as such). It can be a logical drive, a flash drive, a partition of a disk drive assigned to a particular server, or a partition assigned to a particular virtual private server. It can also be a network drive or a portion of a network drive, or it can be a distributed storage system that acts as a single logical drive. The relevant point is that from the perspective of an operating system, a device exists and acts analogously to a hard disk drive or drive partition that can be accessed using operating system mechanisms that access storage devices and appropriate device drivers.

Figure 1A:
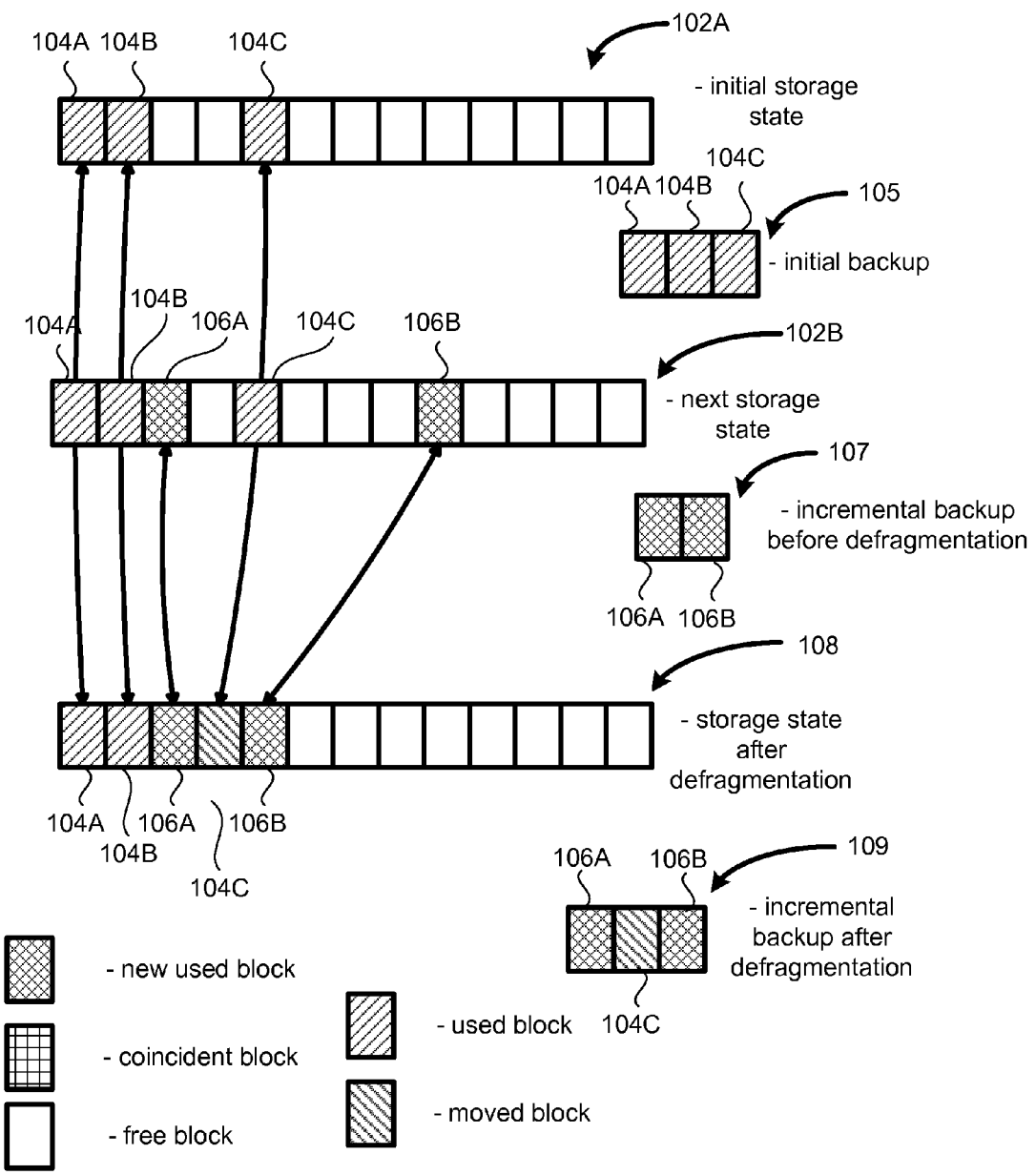
FIG. 1A illustrates a conventional backup, in the form of block data backup.

FIG. 1A illustrates a conventional backup, in the form of block data backup. As shown in FIG. 1A, the initial state of the storage device, such as a disk drive, is designated by 102A. The storage device has three blocks that have useful data, designated 104A, 104B and 104C (obviously, any realistic disk drive has many more than three blocks). An initial backup of 105 of the storage device would store blocks 104A-104C. These blocks may be next to each other on the backup drive, although this need not be the case all the time.

As further shown in FIG. 1A, in the next state 102B, two additional blocks have been added to the initial storage state 102A, these being blocks 106A and 106B. The incremental backup 107 before defragmentation would involve saving the blocks 106A, 106B to the disk image. After the storage drive has been defragmented, see state 108, the incremental backup involves three blocks in this example—106A, 104C and 106B. Block 104C is backed up to the image because it has been moved, not because any of its contents has changed. Here, in reality, only descriptions of the previously existing blocks are changed, along with the description of the physical block, where the old block is moved. This, therefore, illustrates the additional and unnecessary overhead involved with backing up defragmented drives.

Figure 1B:
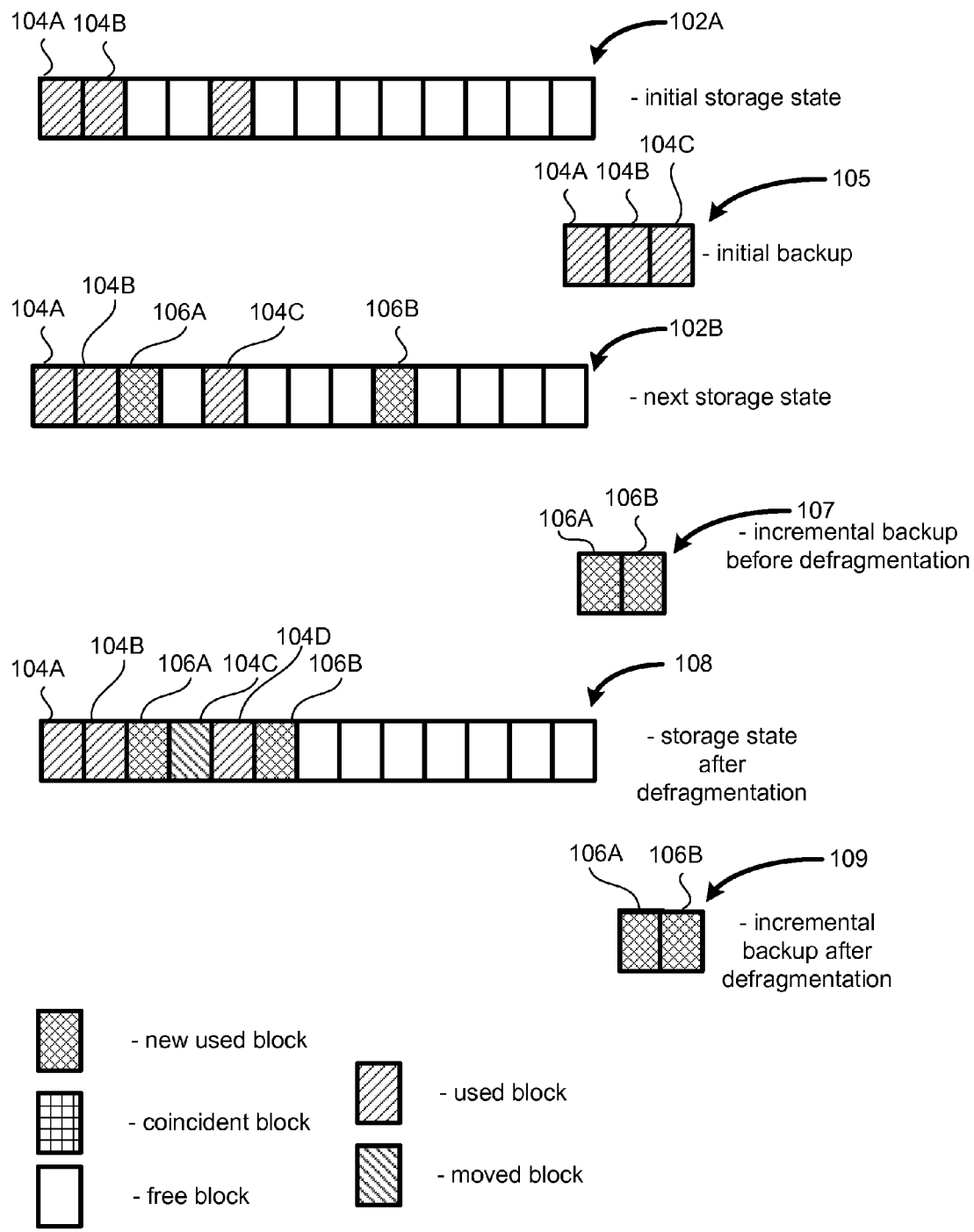
FIG. 1B illustrates how FIG. 1A would be modified in the present invention, notwithstanding the defragmentation process.

FIG. 1B illustrates the situation that would be desirable to have, notwithstanding the defragmentation process. As shown in FIG. 1B, the blocks at issue are the same as in FIG. 1A, and the incremental backup 109 should only be performed for the two added blocks 106A, 106B, and nothing else. In FIG. 1B, the arrows illustrate pointers, or correspondence of the block on the drive being backed up, and a block in the disk image.

Figure 2:
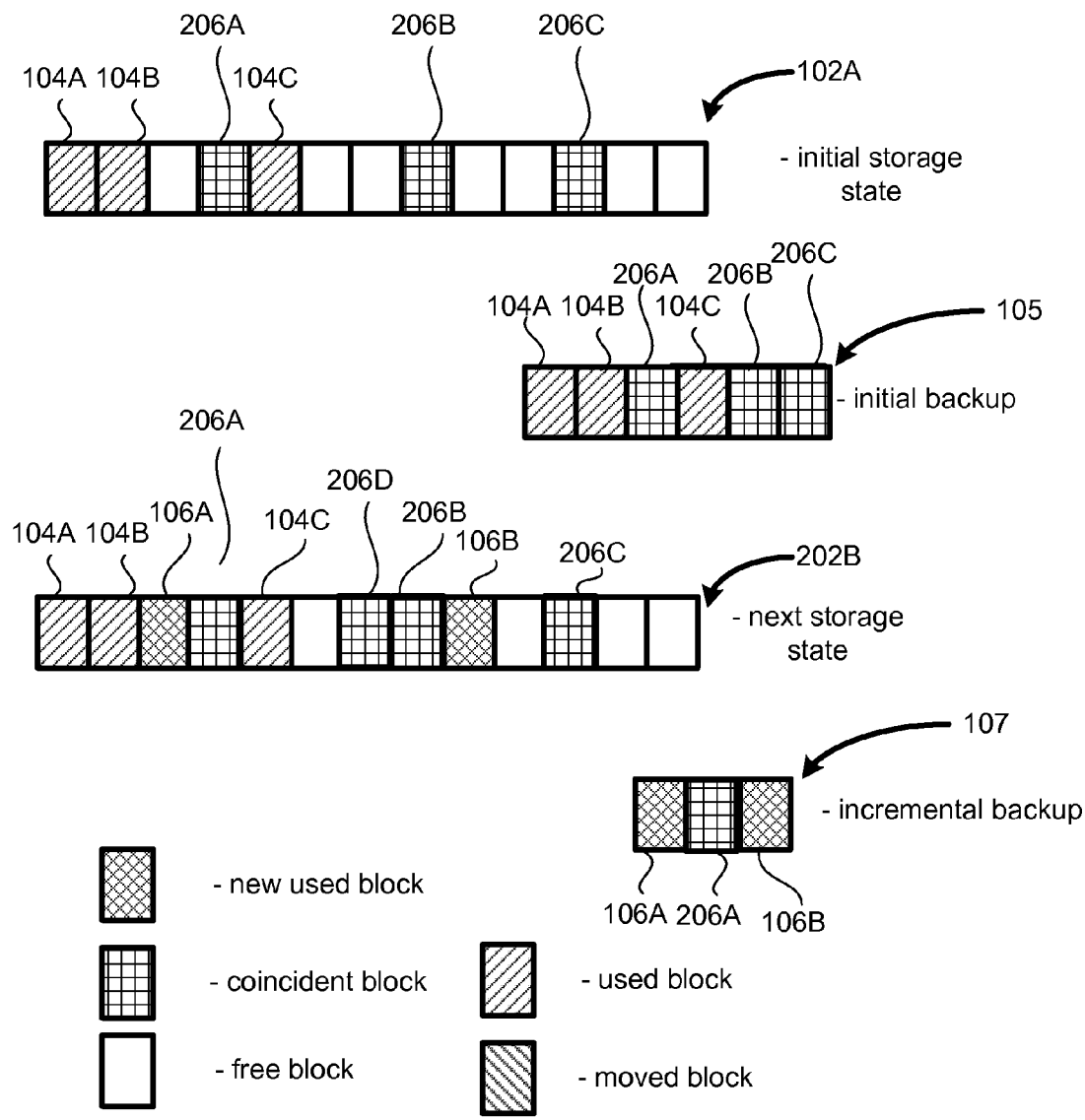
FIG. 2 illustrates another example of how conventional backup software systems handle the situation of several blocks containing the same data.

FIG. 2 illustrates another example of how conventional backup software systems handle the situation of several blocks containing the same data. In this case, blocks 206A, 206B and 206C have identical contents. The initial backup 105 contains the three blocks 104A-104C, and the three blocks 206A-206C. Considering the next storage stage 202B, where another block 206D has been added (with the same content as blocks 206A-206C), as well as the two added blocks 106A, 106B. The incremental backup 107 would involve three blocks 106A, 206A and 106B, notwithstanding the fact that there is already a copy of block 206 in the image. Note that the initial backup can be created using links to coincident blocks.

Figure 3:
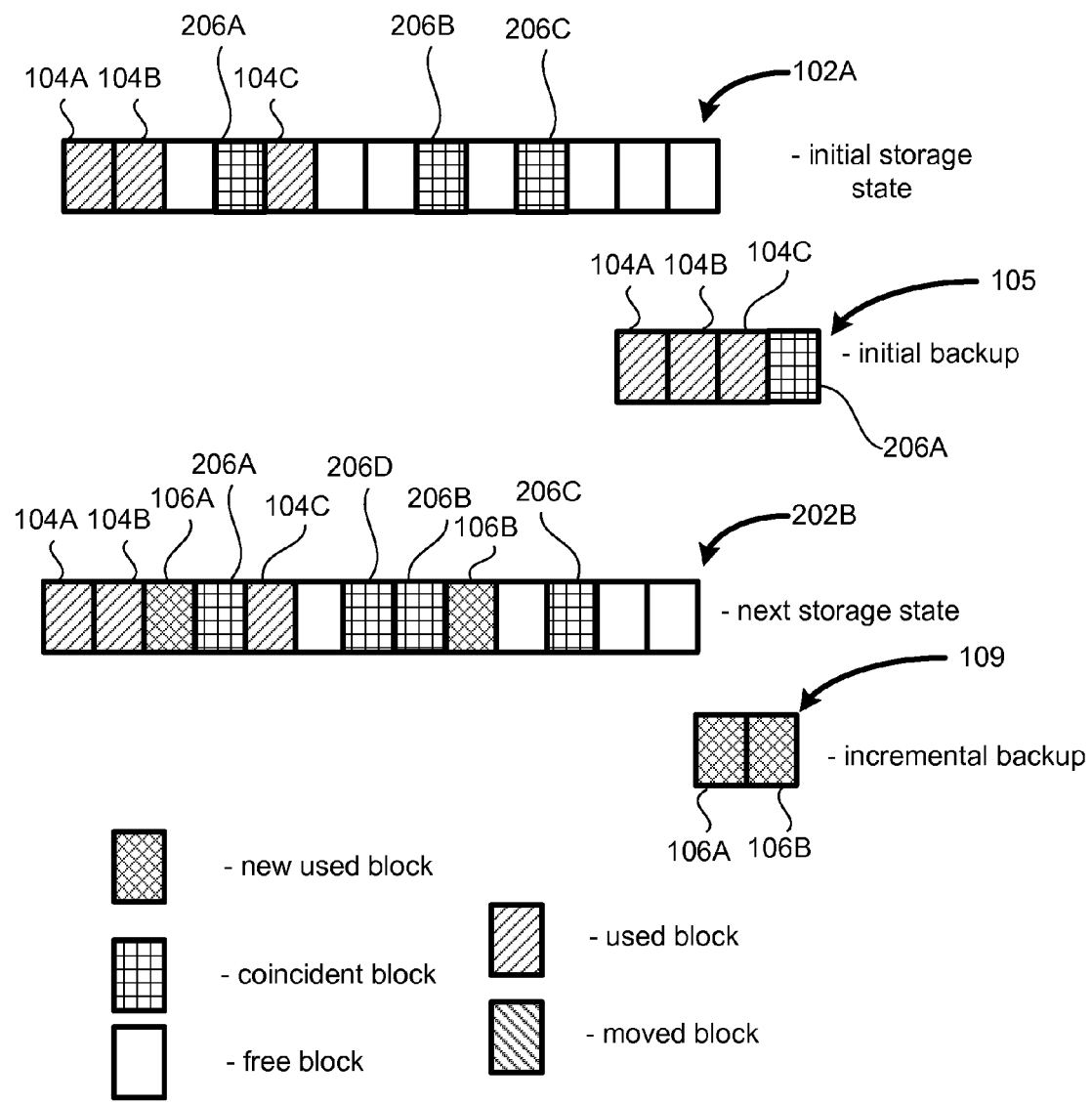
FIG. 3 illustrates how the situation shown in FIG. 2 would be handled according to one embodiment of the present invention.

FIG. 3 illustrates how the situation shown in FIG. 2 would be handled according to one embodiment of the present invention. As shown in FIG. 3, the initial state of the storage has the same six blocks—104A-104C, and 206A-206C, which are identical. The initial backup therefore needs to only consist of four blocks—104A-104C and a single block 206. In the next storage state 202B, two new blocks 106A, 106B have been added, and also one more block 206 (in this case, labeled 206D) has been added. In this case, however the incremental backup 109 only needs to save the contents of the two blocks 106A, 106B.

Figure 4:
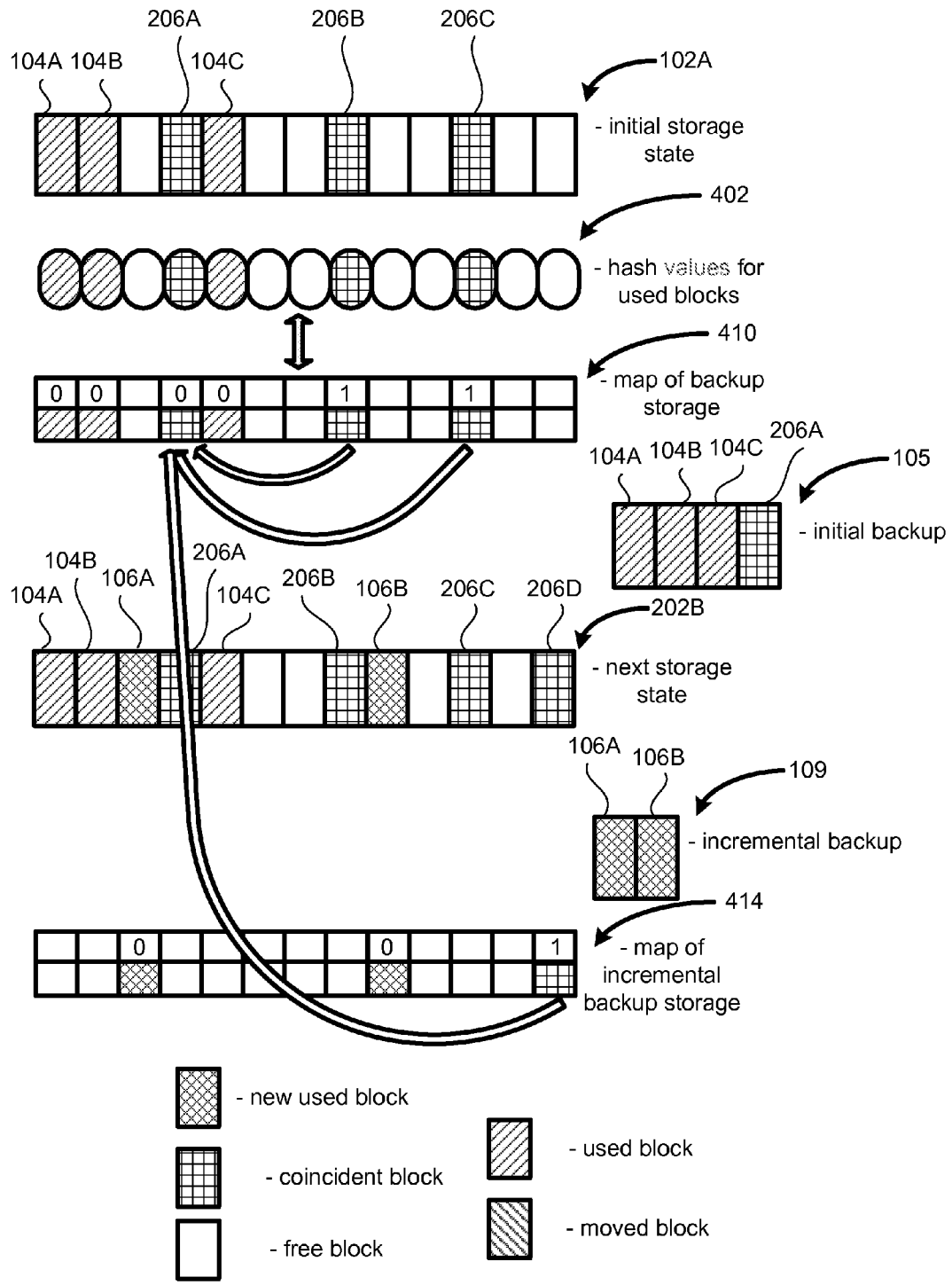
FIG. 4 illustrates how hashes are used to accomplish the backup of FIG. 3.

FIG. 4 illustrates one embodiment of how this goal is accomplished. As shown in FIG. 4, for each block of the initial storage stage 202A, a hash value, using, for example, common hash algorithms such as MD4, MD5, CRC, CRC32, SHA1, SHA2, SHA256, SHA512, Russian national standard GOST R 34.11-94 "Information Technology—Cryptographic Information Security—Hash Function" (incorporated herein by reference), an equivalent standard used by other member-states of the CIS, GOST 34.311-95 (incorporated herein by reference), hash function based on block ciphers and Message Authentication Code (MAC), etc., is calculated. More generally, other one-way functions can be used, such that the value of the function (for instance, the hash value in the case of hash functions) is virtually guaranteed to be unique for different block contents. Thus, the hash table 402 contains the hash values corresponding to the data of the blocks 104 and 206 of the initial storage state 102A. A map 410 keeps track of which blocks are unique, and which are duplicates. In the case of map values that correspond to the blocks 206B, 206C, the bit (1 or 0) indicates that the contents of the hash table is the same as for some other block and, therefore, in this case, the map (which contains addresses of the blocks in the disk image, or some other indicator or pointer to their location), points to the backup block 206A. Therefore, the initial backup 105 needs to only contain three blocks, 104A, 104B, 104C, and a single block 206A, which is identical to the blocks 206B and 206C. Rather than storing the blocks 206B, 206C themselves, the map 410 points to the block 206A instead.

202B in FIG. 4 illustrates the next storage state, where two blocks 106A, 106B have been added and block 206D has also been added. The incremental backup 109, as noted earlier, should only contain the two added blocks 106A, 106B. The incremental map 414, which illustrates the incremental backup (in other words, 414 represents only the change to the map 410), shows the addresses of the backed up blocks 106A, 106B, and a link for block 206D, which points to the image of block 206A. Another advantage of this approach is that the previous backup and incremental backups can be permanently stored. The contents of blocks being deleted and restored (e.g., after software reinstall) should not be backed up repeatedly.

Using pointers to blocks whose content is stored in previous backup sets requires permanent access to those sets. If the volume of sets that can be simultaneously accessed needs to be limited, then a set of predefined rules may be used for using redirection pointers in incremental backups. For example, an earliest backup set where pointers can be used can be defined. If the block content is stored in an earlier backup, then the pointer is not used, and contents of that block is saved in the current backup. This reduces of the number of backup sets used simultaneously, and improves performance during restoration from backup. The criteria of defining the earliest backup set may be, e.g., the total amount of backup sets or the date of earliest backup. Another advantage is the possibility of freeing storage space if storage with fixed capability is used for backing up.

Figure 5:
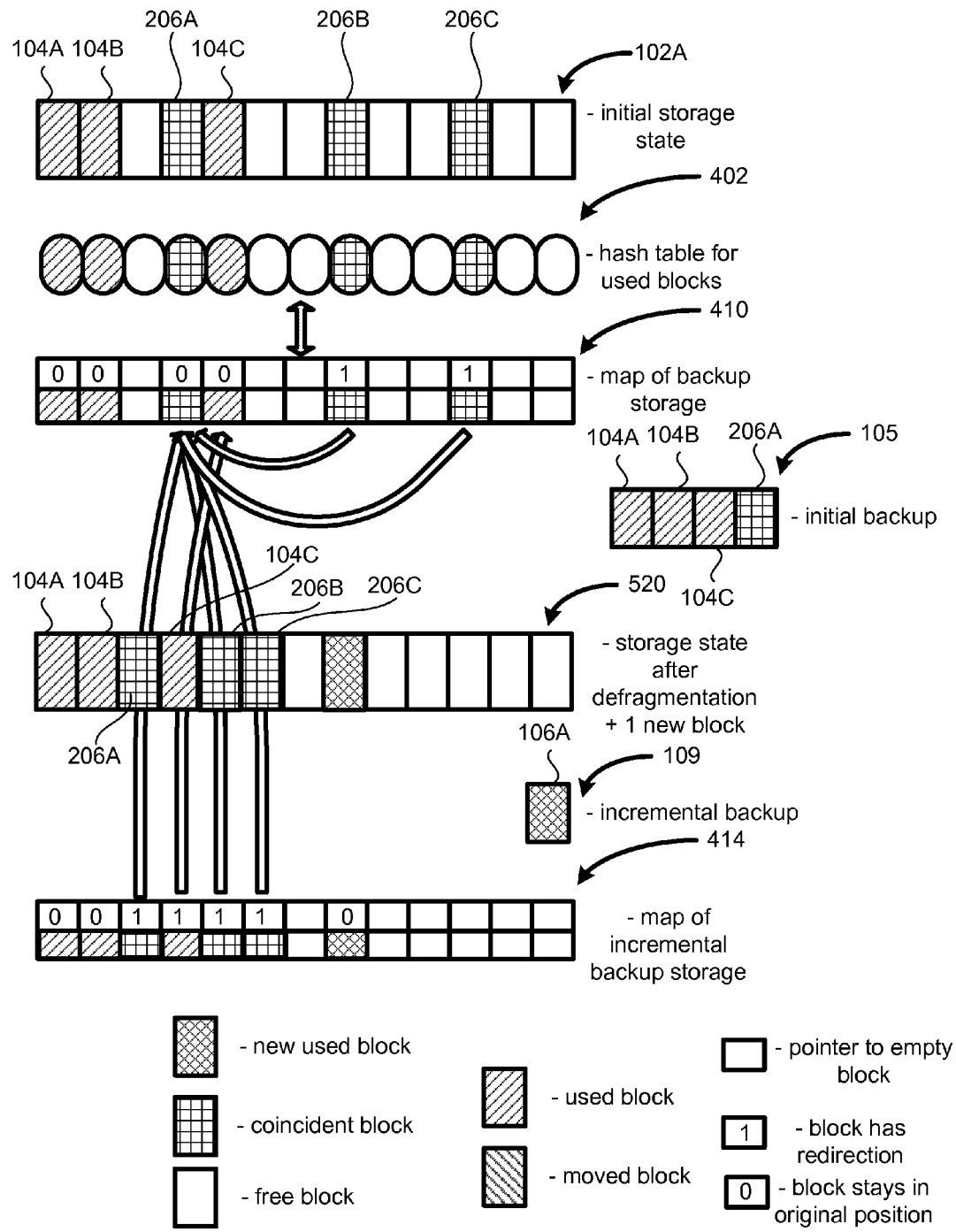
FIG. 5 illustrates how one embodiment of the present invention works in the case of defragmentation of the drive being backed up.

FIG. 5 illustrates how one embodiment of the present invention works in the case of defragmentation of the drive being backed up. 520 in FIG. 5 illustrates the defragmented disk, with a single block 106A added to it. Note that the other blocks are arranged compactly, next to each other. The incremental backup 109 in this case consists of only the single block 106A. The map of the incremental backup in this case uses links to point to the originally backed up blocks—note that the links in this case include not only the blocks 206B, 206C (which are identical to 206A), but also the block 104C, which has been moved on the disk that is being defragmented and backed up, but the contents of that block has not changed. The fact that the contents has not changed can also be verified using the hash value in the table 402 for that block.

Note that a fairly common situation is that the image is stored on a drive that is physically different from the disk drive that is being backed up. However, this need not be the case. For example, the drive on which the image of the disk is created can be physically the same drive, can be a partition of the drive, a logical drive, a network drive, a distributed storage system, etc.

The invention can optionally use an additional step of checking block content coincidence (identity), since hash values do not always provide reliable information.

In the process of storing data in the backup storage, the backup storage can contain two types of data:

1. Block identifier and contents of corresponding block.
2. Block identifier and pointer or identifier of block containing actual data, such as a pointer to a block with the same contents and hash value.

In this case, an indicator or an extra bit in the bitmap can be used to define whether the backup storage contains actual contents or pointer. The size of corresponding data may be used as the indicator, since all pointers contain a similar number of bytes and preferably have equal size.

Figure 7:
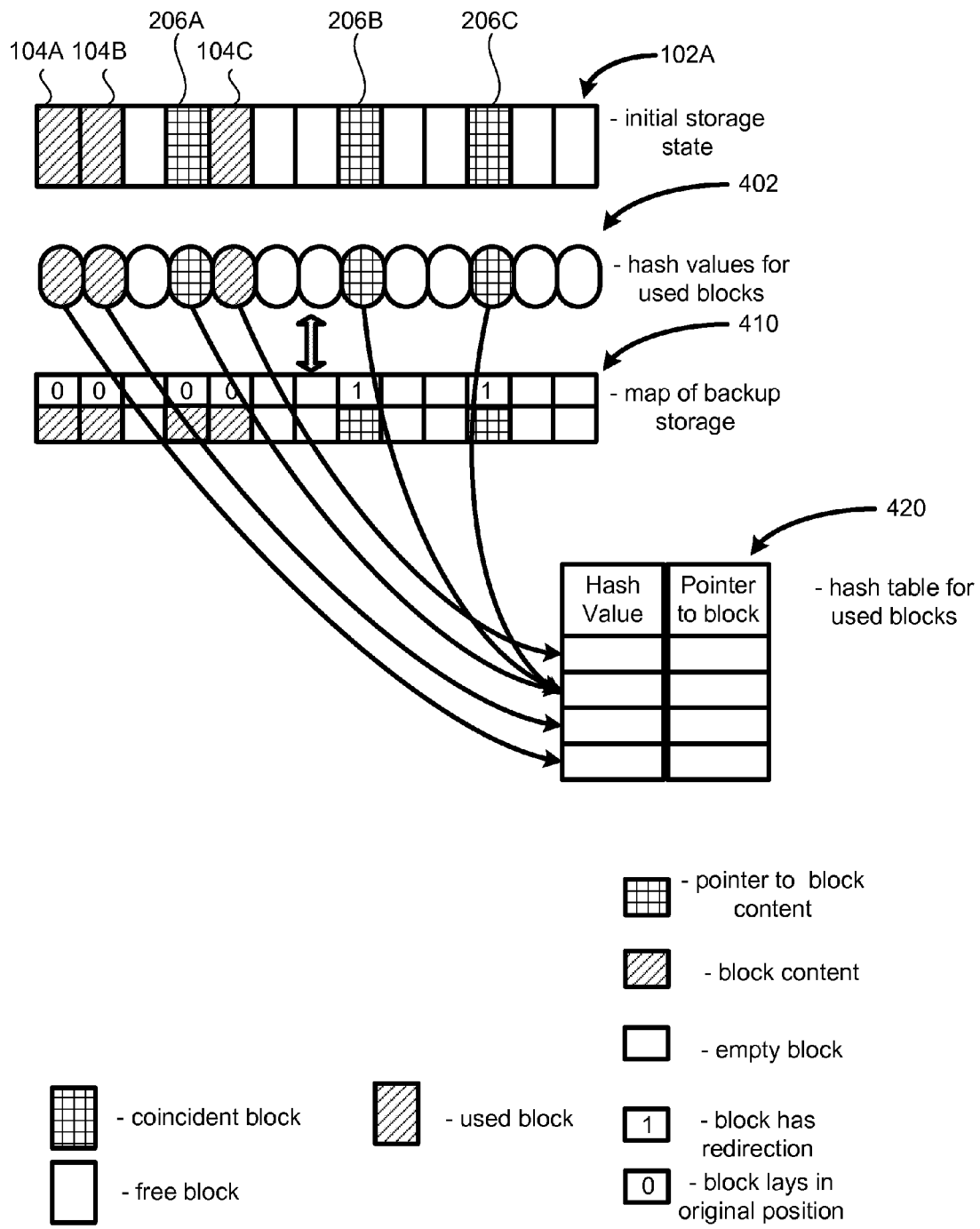
FIG. 7 illustrates the use of hashes in one embodiment of the invention.

FIG. 7 illustrates the use of hashes and maps in one embodiment of the invention. As shown in FIG. 7, a hash table 420 contains hash values and corresponding pointers for the backed-up blocks. In this case, blocks 206A, 206B, 206C contain identical data, and their hashes are therefore identical. Instead of storing blocks 206A, 206B, 206C in the backup, only one block—206A—needs to be stored, and only hash values may be stored instead of the remaining blocks contents. Here, pointers to actual content of blocks are stored in the table 420.

Figure 6:
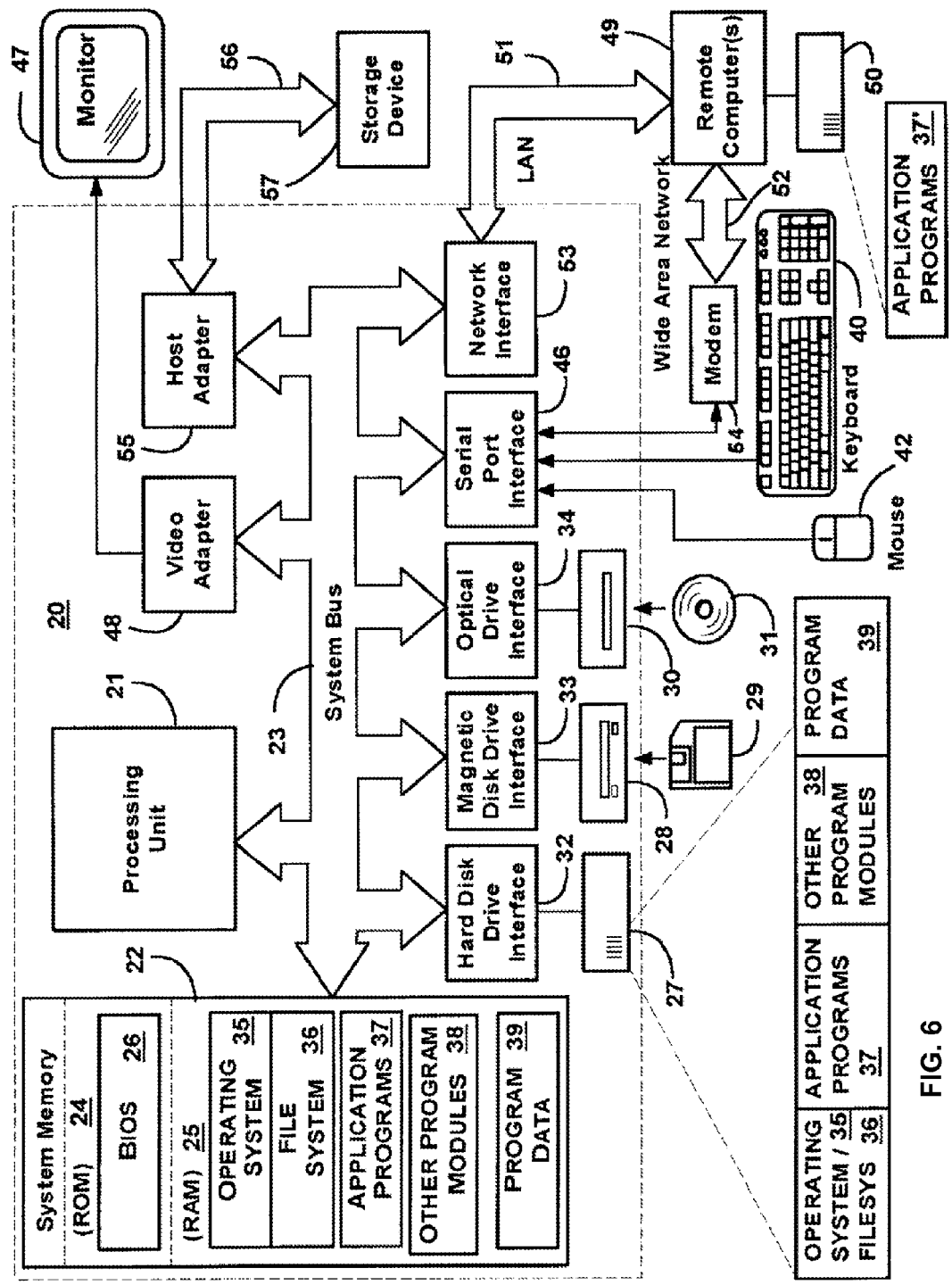
FIG. 6 illustrates an example of a computing system that may be used in the invention.

With reference to FIG. 6, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

It should be noted that in some cases, the same hash values may correspond to blocks with different contents. In this case, in one embodiment of the invention, only one block is reflected in hash table and all other blocks with same hash value but different contents are also stored in subsequent backup sets, even if some of those blocks coincide with each other.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer implemented method for data backup, the method for data backup executed on a processor, the method comprising:
   (a) forming an image of a storage device, wherein contents of blocks of the storage device are restorable from the image;
   (b) for each block stored in the image, storing a hash function value in a hash table representing contents of each block;
   (c) for each additional block of the storage device to be backed up to the image, generating a hash function value corresponding to contents of that block;
   (d) comparing the hash function values to identify, out of blocks of the storage device, candidate blocks that might have identical contents with contents of blocks stored in the image;
   (e) if the hash function values are not coincident, then backing up, to the image, contents of unidentified blocks and blocks that do not have identical hash function values, and
   (f) if the hash function values are coincident, then for blocks of the storage device with identical hash function values, storing links in the image instead of the contents of the blocks,
   (g) wherein links for multiple blocks of the storage device with identical contents point to a single block in the image,
   (h) wherein the image of the storage device contains a bitmap of the storage device backup;
   (i) the bitmap contains indicators for use of the links, such that an indicator defines if a block contains the content or if the block points to another block,
   (j) the bitmap contains indicators that reflect used and unused blocks such that an indicator of one setting represents a used block whose contents are shared with another block in the image, and a bit of an alternate setting corresponds to an unused block whose contents are unique to every other block in the storage image; and
   (k) wherein the unused blocks do not require backing up of their contents.

2. The method of claim 1, wherein if the hash function values are coincident, then further comprising comparing contents of candidate blocks with contents of corresponding blocks stored in the image, and backing up, to the image, contents of unidentified blocks and blocks that do not have identical contents.

3. The method of claim 1, wherein the image includes data of different backups.

4. The method of claim 1, wherein the image contains backups of different storage devices.

5. The method of claim 1, wherein hash function is any of MD4, MD5, CRC, CRC32, SHA1, SHA2, SHA512, SHA256, GOST, hash function based on block ciphers and Message Authentication Code (MAC).

6. The method of claim 1, further comprising restoration of the storage device from the image, wherein contents of blocks pointed by link is restored to corresponding blocks of the storage device.

7. The method of claim 1, wherein the link for the block is stored in the image instead of contents of the corresponding block.

8. The method of claim 1, wherein the image includes an indicator reflecting use of the link for the block contents.

9. The method of claim 8, wherein a bitmap is created for the storage device backup; and
   wherein the bitmap includes indicators for use of the links.

10. The method of claim 9, wherein the bitmap further reflects unused blocks of the storage device; and
    wherein the unused blocks do not require backing up of their contents.

11. A non-transitory computer useable recording medium having computer program logic stored thereon for executing on a processor for data backup, the computer program logic performing the method of claim 1.

12. A system comprising a processor and a memory and code loaded into the memory for performing the method of claim 1.

* * * * *